June 3, 1930.  B. GREENFIELD  1,761,295
FLUID METER
Filed Aug. 29, 1919   4 Sheets-Sheet 1

INVENTOR
Benjamin Greenfield
BY
Edmund G Borden
ATTORNEY

June 3, 1930. B. GREENFIELD 1,761,295
FLUID METER
Filed Aug. 29, 1919 4 Sheets-Sheet 2
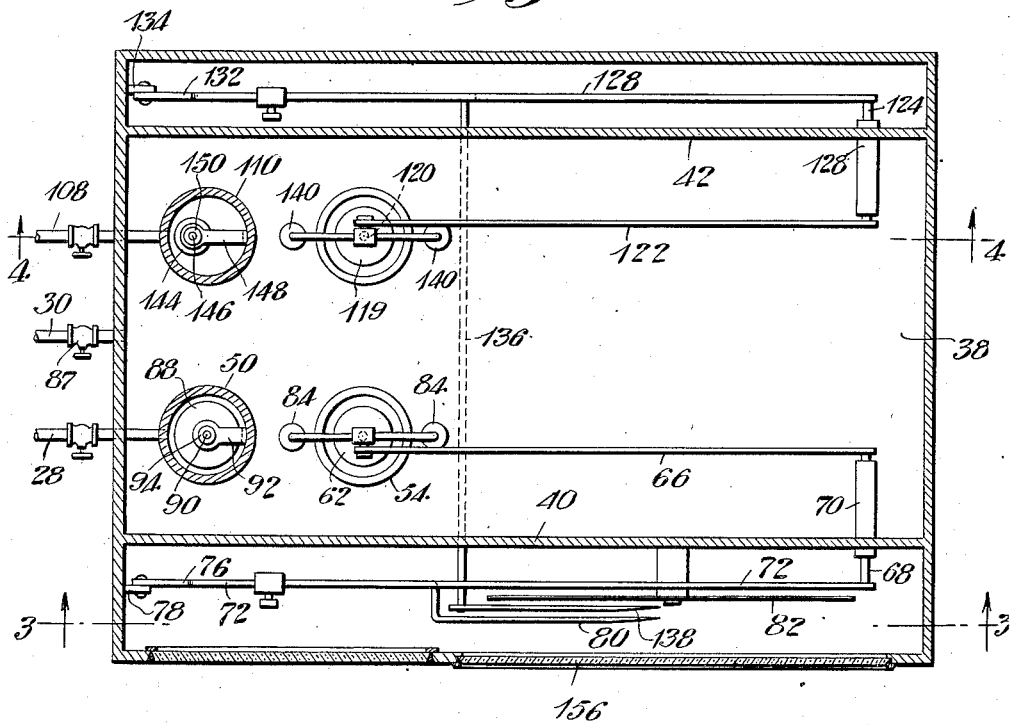

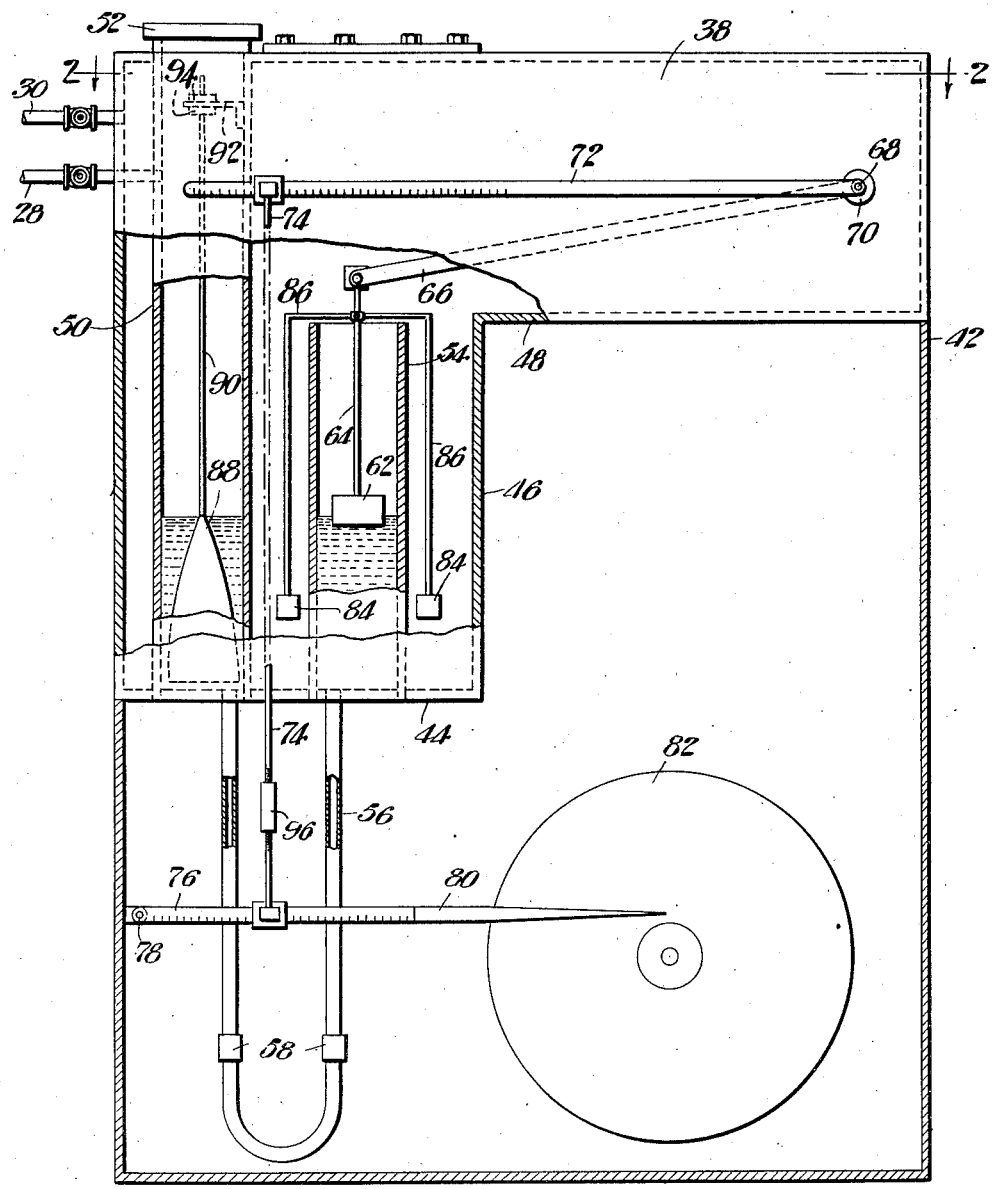

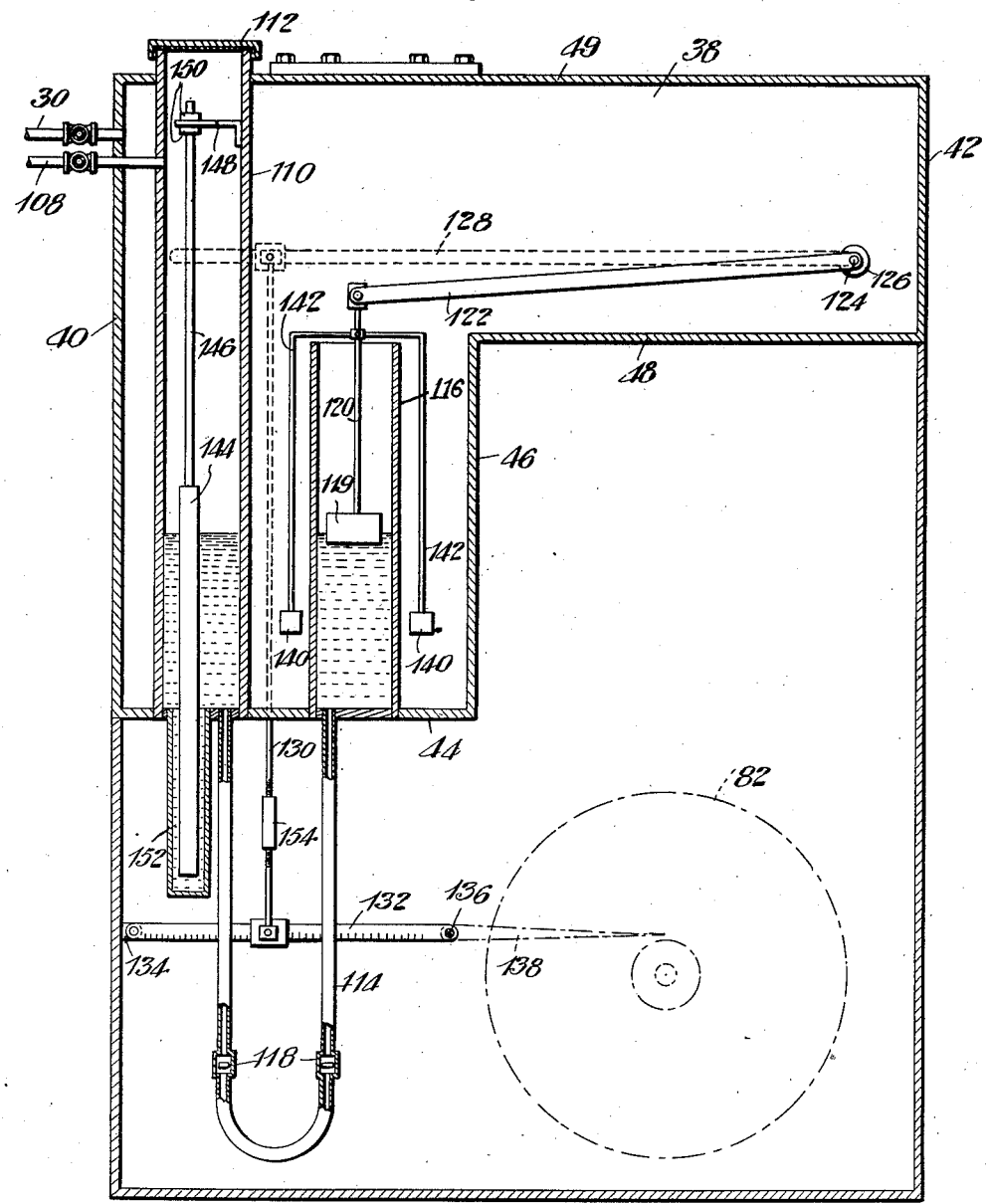

Patented June 3, 1930

1,761,295

UNITED STATES PATENT OFFICE

BENJAMIN GREENFIELD, OF BARTLESVILLE, OKLAHOMA, ASSIGNOR, BY MESNE ASSIGNMENTS, TO DOHERTY RESEARCH COMPANY, OF NEW YORK, N. Y.

FLUID METER

Application filed August 29, 1919. Serial No. 320,685.

This invention relates to fluid meters and more particularly to a method of and apparatus for measuring the rate of flow and the density of fluids flowing through conduits under pressure.

Orifice meters, Venturi meters and other similar measuring devices which make use of the pressure drop generated by flowing fluid for operating a mechanism for indicating the rate of flow have come into wide use. The devices at present on the market are, however, limited to fluids having practically a constant density and for this reason are not well suited to the measurement of the flow of such fluids as mineral oils, vegetable oils, or mixtures of two liquids of different densities. This is due to the fact that a meter of this type is essentially a volume measuring meter and since the flow indicating device is a differential pressure measuring device and not a differential head measuring device it becomes necessary to take into account the density of the fluid being measured if the measurements are to be accurate on liquids of varying density. In other words for a given drop in pressure through an orifice or similar device the rate of flow in terms of unit volume flowing in unit time will vary essentially inversely as the square root of the density provided the viscosity of the fluid remains unchanged.

The devices at present on the market are also not well suited to the measurement of viscous liquids, corrosive liquids, liquids carrying much solid matter in suspension, mixtures of liquids which can stratify in the small pipes leading the pressure drop through the orifice to the indicating device, hot fluids (such as hot oils of a refinery) or liquids which may freeze or solidify to more or less degree in the flow indicating device or the pipes leading the pressure drop to the flow indicating device.

The object of the present invention is to provide a method by which the rate of flow of a fluid of any density through a conduit under pressure may be accurately determined.

Water containing alkali salts in solution is found in many petroleum wells and this water comes out of the wells with the oil in the form of a mixture or emulsion. To determine the quantity of water-free oil carried by a mixture of water and oil of variable proportions flowing from wells to a common collecting main, it is necessary not only to measure the volume of liquid passing through the conduits but to also determine the proportions of water and oil in the volume of liquid measured. The proportion of water and oil in the liquid may be determined by measuring the density of the liquid and calculating the composition of the liquid from the known densities of pure oil and water. For instance, if the density of a mixture of water and oil is midway between the densities of pure oil and of water, the mixture will contain approximately equal amounts of water and oil. Having determined the composition and the rate of flow of the liquid, the amount of water-free oil passing through the conduits may be easily calculated.

With this in view, another object of the invention is to determine the density and composition of the fluid flowing through the main or conduit under pressure.

The difference in pressure developed by the flow of the fluid through an orifice or other similar device, is not proportional to the rate of flow of the fluid, but is a function of the rate of flow which, in the case of liquids or other incompressible fluids, can be expressed by the formula: $V = K \sqrt{h}$, where: $V$=the velocity of the fluid, $K$ is a constant, and $h$=the head or pressure of the fluid. In the ordinary type of fluid measuring device, the movement or displacement of the flow indicating element or pointer is proportional to the difference in pressures developed and is consequently not proportional to the rate of flow. Thus, as the flow of fluid increases, the displacement of the pointer or indicator increases in an ever increasing ratio. The spaces on the indicator scale indicating equal changes in the rate of flow, must accordingly be unequal and the readings will have a smaller degree of accuracy as the spaces get closer together. It is therefore desirable that there should be equal displacements of the pointer for equal changes in the rate of flow at all points on the scale, in order that the readings may be made with the same degree of accuracy at all parts of the scale. It is more especially desirable that these spaces should be equal, when, as in the present case, the same scale is used for indicating the density or composition of the solution, as a less confusing diagram is thereby obtained.

With this in view, another object of the present invention is to provide a fluid meter in which equal differences in the rate of flow of the fluid will cause equal displacements of the flow indicator.

A further object of the invention is to provide an improved mechanism for measuring differences in pressure due to the flow of fluid and to the density of the fluid.

With these and other objects in view, the invention consists in the process and apparatus described in the following specification and defined in the claims.

In the accompanying drawings is shown a fluid meter embodying the preferred form of the invention, in which:

Fig. 2 is a horizontal sectional view of the fluid meter, taken on line 2—2 of Fig. 3;

Fig. 3 is a vertical sectional view of the fluid meter on the line 3—3 of Fig. 2, parts being broken away to show details of construction; and Fig. 4 is a vertical sectional view of the fluid meter, taken on line 4—4 of Fig. 2.

Figure 1:
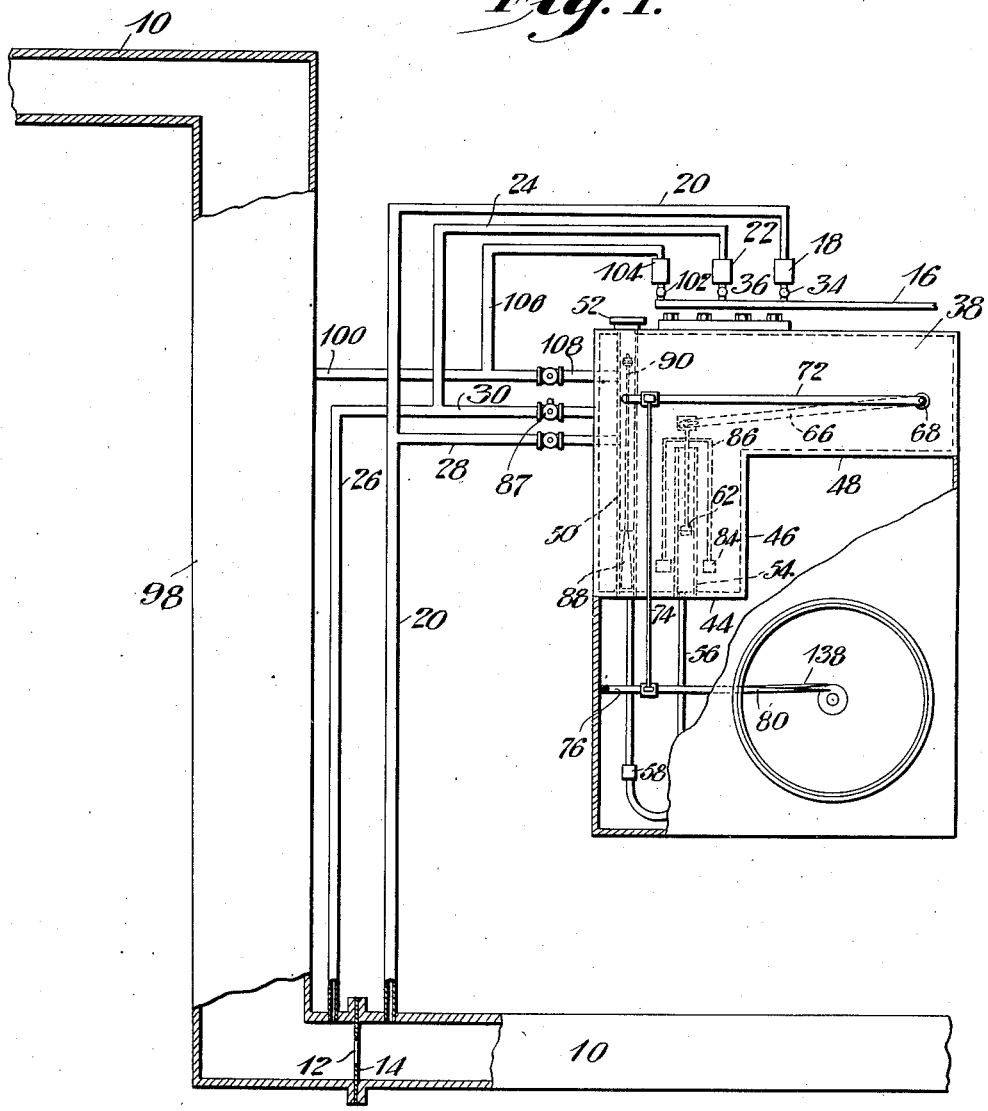
Fig. 1 is a vertical front view of the improved fluid meter, parts being broken away to show the interior arrangement of the apparatus.

The present invention embodies many of the basic principles of applicant's co-pending application, Serial No. 285,596. The present invention differs generally from this co-pending application in that it is adapted to measure both the rate of flow and the density of a fluid flowing through a conduit under any pressure. In the apparatus of the present invention, the liquid whose density and rate of flow are to be measured, is caused to flow through an orifice under a difference or drop in pressure which has a definite relation to the rate of flow through the orifice. The difference or drop in pressure is measured by separate, regulated, streams of air or gas which are forced into the fluid a short distance in front of and at the rear of the orifice under pressures substantially equal to that of the fluid at the opposite sides of the orifice. The pressures of these two streams of air or gas are separately transmitted to a recording device which measures the difference in pressures and indicates the pressure difference in terms of the rate of flow.

To indicate the rate of flow of fluid, the pressures of the streams of gas entering on opposite sides of the orifice are transmitted to two surfaces of a substantially U-shaped body of liquid in a flow indicating apparatus. This U-shaped body of fluid is contained in two upright cylinders, forming the arms of a U-shaped container or manometer, and a connecting tube connecting the lower ends of the cylinders. The pressures of the air streams on opposite sides of the flow measuring device are transmitted to the top of the upright cylinders and displace the levels of the liquid according to the difference in pressures. This displacement of the levels of the liquid is transmitted, by means of a float in one of the cylinders and a system of levers, to a pivoted pointer which moves over a scale calibrated to indicate the rate of flow of fluid corresponding to any displacement of the pointer.

In measuring the density of a fluid flowing under pressure, the fluid is caused to pass upwardly at a slow rate of speed and two separate streams of air, or other gas, are forced at substantially equal rates into the fluid at different levels. The pressures of these two streams of gas will differ by an amount proportional to the weight or density of the fluid between the levels at which the gas is forced into the fluid. The pressures of the two streams of gas are transmitted to an indicating apparatus which measures the difference in pressures and indicates this difference in terms of the density of the fluid.

To indicate the density of the fluid, the pressures of the streams of air introduced at different levels into the vertical pipe are transmitted to the surfaces of a second body of liquid in a manometer forming part of a density indicating apparatus. The surfaces of the manometer liquid will be displaced by the pressures of the gas, to correspond to changes in the density of the fluid. This displacement in the levels of the liquid is transmitted by means of a float and lever device to a pivoted pointer which moves over a calibrated scale in accordance with the degree of displacement of the liquid level. The scale over which the flow indicating and density indicating pointers move, is in the form of a dial rotated by clockwork. The pointers are provided with pens which simultaneously trace two records on the rotating dial to indicate the rate of flow and density or composition of the fluid at any time.

Referring more particularly to the drawings, the apparatus for determining the rate of flow of oil or other liquid flowing through a pipe or conduit, is shown in Figs. 1, 2 and 3. The liquid flowing through a conduit 10 under pressure is passed through an orifice 12 in a plate 14 mounted transversely in the pipe 10. A current of gas under pressure from a supply pipe 16 passes at a slow rate through a bubbler 18 having glass walls thru which the rate of passage of gas may be observed, and thru a pressure pipe 20 leading to the pipe 10. The current of gas from the pipe 20 enters the pipe 10 as a short distance in front of the orifice 12 and is controlled to have a pressure approximately equal to that of the fluid at this point. Similarly a second current of gas passes from the pipe 16 through a second flow indicating bubbler 22 and pressure pipes 24 and 26 and enters the pipe 10 at a short distance in the rear of the orifice 12 under a controlled pressure approximately equal to the fluid pressure at this point. The pressures in the pipes 20, and 24 and 26 are transmitted through branch pipes 28 and 30 respectively to a flow indicating and recording device in which the rate of flow of the fluid is recorded.

The rate at which gas is supplied from the pipe 16 through the pipes 20 and 24 respectively is controlled by means of needle valves 34 and 36. The valves 34 and 36 are adjusted to develop pressures in the pipes 20 and 24 approximately equal to the pressures at opposite sides of the orifice plate 14, and the regulation of the rate at which the air is supplied to the pipes 20 and 24 may be observed by counting the bubbles rising through the bodies of liquid contained in the bubblers 18 and 22.

The device for indicating and recording the flow of liquid in the conduit 10 is shown in Figs. 1, 2 and 3. The gas pressure developed in the pipe 24 is communicated by the pipe 30 to a closed chamber 38 (Figs. 3 and 4) formed in an indicating apparatus casing consisting of side walls 40 and 42 (Fig. 2), bottom walls 44, 46 and 48, and top wall 49 (Figs. 1 and 4). The pressure developed in the pressure pipe 20 is communicated by the pipe 28 to a closed cylindrical container 50 extending from the bottom wall 44 of the chamber 38 through the top of the chamber. To permit liquid to be introduced into or removed from the cylinder 50, the cylinder is provided at its upper end wih a removable cap 52. A shorter cylinder 54 open at the top, is mounted in the bottom wall 44 of the chamber 38 and is connected at its lower end to the lower end of the cylinder 50 by means of a U tube 56. The cylinders 50 and 54 and the connecting tube 56 are partly filled with mercury or other suitable liquid to form a manometer. The pressure of gas in the pipe 30 is transmitted through the chamber 38 to the surface of the liquid in the cylinder 54 and the pressure of gas in the pipe 28 is transmitted directly to the surface of a liquid in the cylinder 50.

As the rate of flow of fluid through the pipe 10 varies, a difference in pressure will be built up in the pipes 20 and 26. This difference in pressure transmitted through branch pipes 28 and 30 to the levels of liquid in the cylinders 50 and 54, will force liquid from one cylinder to the other until the pressure difference is balanced by the difference in level of the liquid in the cylinders 50 and 54. To prevent an abnormal difference in pressure from blowing the liquid out of one of the cylinders into the other through the pipe 56, excess pressure check valves 58 are provided in both legs of the U-tube 56. The valves 58 are floated off from their valve seats when the pipe 56 is full of liquid, but if the liquid is forced down below one of the valves 58, the valve will fall onto its valve seat and prevent any further passage of liquid or gas.

The change in the level of the liquid in the cylinder 54 is transmitted to lever mechanism of a flow indicating pointer which moves over a scale having graduations to indicate rates of flow. To this end a float 62 is pivotally connected by a stem 64 to one end of a lever arm 66 (Figs. 2 and 3). The lever arm 66 is carried on a rock shaft 68 mounted in a pressure-stuffing box or bearing 70 passing through the wall 40 of the chamber 38. Upon the end of the shaft 68 outside the chamber 38 is rigidly fixed a lever arm 72 on which the upper end of a link 74 is slidably mounted. The lower end of the link 74 is slidably mounted on a lever 76 pivoted at one end to a bracket 78 on a wall of the flow indicating casing. The other end of the lever 76 carries a pointer 80 which moves over a dial 82. As the level of liquid in the cylinder 54 rises or falls through the action of a difference in pressure in the pipes 28 and 30, the float 62 rises or falls and transmits motion to the end of the lever arm 66. This motion is then transmitted through the lever arms 66 and 72 and the link 74 to the lever 76 and pointer 80. In order to lower the centre of gravity of the float 62 and stem 64 and prevent the float from wedging against the side of the cylinder 54, weights 84 carried by supporting arms 86 are rigidly fastened to the stem 64. By the above mechanism the level of liquid in the cylinder 54 corresponding to any rate of flow of fluid through the pipe 10 is indicated by the position of the pointer 80 on the dial 82 which is graduated to indicate the corresponding rate of flow.

In adjusting the apparatus for any given range in the rate of flow, the cap 52 is removed from the cylinder 50 and the proper amount of liquid is poured into, or removed from, the cylinder 50 to raise or lower the float 62 in the cylinder 54 until the pointer 80 is brought to the zero mark on the dial 82. While this adjustment is being made, the pressure in the chamber 38 is brought to atmospheric pressure by adjusting a valve 87 in the pipe 30. The pressure in the cylinder 50, when the cap 52 is removed will, of course, be the same as that of the atmosphere. Thus, the pressures in the cylinders 50 and 54 are equal and correspond to zero rate of flow in the pipe 10. It is, however, difficult to pour just the right amount of liquid into the cylinder 54. To obtain a final adjustment of the liquid levels, therefore, a displacement member 88 is mounted in the cylinder 50. The displacement member 88 is provided with a stem 90 which passes through a bracket 92 on the wall of the cylinder 50 and is held in position on the bracket by means of adjusting nuts 94. To raise or lower the level of the liquid in the cylinders 50 and 54, the displacement member 88 is lowered or raised by means of the adjusting nuts 94 until a sufficient amount of liquid is displaced to bring the level of liquid in the cylinders to the desired point.

The displacement member is so shaped that the rise and fall of the float 62 in the cylinder 54 is proportional to changes in the rate of flow of the fluid being measured. Inasmuch as the difference in pressures in pipes 28 and 30 and the corresponding difference in levels of the liquid in the cylinders 50 and 54 are not proportional to the flow of fluid through the orifice 12, a displacement member of variable cross-sectional area must be employed in order that the liquid level in the cylinder 54 and the float 62 be given a displacement proportional to the flow of fluid. In the case of a liquid flowing through a circular orifice, for instance, the rate of flow varies with the square root of the difference in pressures. If then, the rate of flow is doubled, the difference in pressures in the pipes 28 and 30 and the difference in levels in cylinders 50 and 54 will be increased fourfold. In order to make the rise and fall of the liquid level in the cylinder 54 proportional to the rate of flow, the displacement member 88 in the cylinder 50 is so shaped as to have an increasing cross-sectional area towards its lower part, thereby causing the liquid level to fall much more rapidly in the cylinder 50 than it rises in the cylinder 54. The shape of the displacement member 88 will be so proportioned, in any given case, to correspond to the relation of flow to pressure, that the height of the liquid level in the cylinder 54 will be directly proportional to the rate of flow of fluid in conduit 10.

In many cases it is not desirable to disturb the pressures in the cylinder 50 and chamber 38 when adjusting the pointer 80 to the zero point. In these cases the adjustment may be made by varying the length of the link 74. For this purpose the link 74 is divided into two parts, the ends of which are oppositely threaded and are connected by means of a turn-buckle 96. By turning the turn-buckle 96 to the right or left, the length of the link 74 may be increased or decreased and the pointer 80 thereby raised or lowered to the zero point without changing the position of the lever arm 72 or the levels in the cylinders 50 and 54.

When the fluid meter is to be used to measure rates of flow which may vary between different limits, the deflection of the pointer 80 for any variation in the rate of flow should be so adjusted that a full scale deflection of the pointer will be obtained for the maximum rate of flow. In order to vary the deflection of the pointer 80 for any given rate of flow, the link 74 is adjusted longitudinally of the lever arms 72 and 76. To decrease the movement of the pointer 80 for a given change in density, the link connections are slid toward the rock shaft 68 and away from the pivoted bracket 78. By moving the connections of the link 74 away from the rock shaft 68, and toward the pivoted bracket 78, the movement of the pointer 80 for any given change in the rate of flow is correspondingly increased. In this way, the apparatus may be adjusted to give a full scale displacement of the pointer for any given range in the rate of flow. The levers 72 and 76 are suitably graduated to express the ratio of pointer deflection to the rate of flow.

The mechanism for determining the density of the liquid flowing through the conduit 10 is shown more particularly in Figs. 1, 2 and 4. As shown in Fig. 1, the fluid leaving the orifice 12 is caused to flow upwardly at a slow velocity through a vertical enlarged section 98 of the main conducting pipe 10. The density measurement consists in developing a difference in pressure proportional to a known head of liquid in the section 98. One pressure is measured by means of a pressure developed in pipes 24 and 26, also used for measuring the rate of flow, and the other pressure is measured by the pressure developed in a pipe 100 connected with the section 98 at a predetermined distance above the lower end of the pipe 26. A gas pressure approximately equal to that of the fluid in the pipe section 98 at the point of connection of the pipe 100 therewith, is developed in the pipe 100 from the pressure supply pipe 16 by means of a needle valve 102. The gas from the pipe 16 passes through the valve 102 in a regulated quantity as indicated in a bubbler 104 mounted immediately above the valve, and then flows through a pipe 106 to the pressure pipe 100. The pressure in the pipes 100 and 106 is transmitted to the density and flow indicating casing through a branch pipe 108 connected at the junction of pipes 100 and 106. The pipe 108 communicates with and transmits pressure to a vertical cylinder 110 mounted in the indicator casing chamber 38 similarly to the cylinder 50 of the flow indicating apparatus. A closing cap 112 is mounted at the upper end of the cylinder 110 by which access may be had to the interior of the cylinder. The lower end of the cylinder 110 is connected by means of a U-tube 114 to a vertical cylinder 116 mounted on the bottom wall 44 with its upper end in open communication with the chamber 38. The U-shaped container formed by the cylinders 110 and 116 and the connecting tube 114 is partly filled with mercury or other liquid to form a manometer. The connecting tube is provided with excess pressure valves 118 similar to the valves 58 of the tube 56.

When the pipe section 98 is filled with fluid whose densities are to be determined, pressures are transmitted through the pipes 100 and 108 to the cylinder 110 and through the pipes 26 and 30 and chamber 38 to the cylinder 116. The pressures transmitted from the pipes 26 and 100 will be different and the difference in pressure for any given position of the pipes 26 and 100 will be proportional to the density of the fluid in the pipe 98. As the density of the fluid in the pipe 98 varies, the liquid will be forced out of one of the cylinders 110 and 116 into the other cylinder, and the levels of the liquids in the cylinders will rise or fall correspondingly. The change of level of liquid in the cylinder 116 is transmitted through a lever mechanism to a density indicating pointer by means of a float 119 having a stem 120 pivotally connected to a lever arm 122. The lever arm 122 is carried on a rock shaft 124 in a pressure tight stuffing box or bearing 126 passing through the wall 42 of the chamber 38. The end of the shaft 124 outside the chamber 38 carries a lever arm 128 rigidly fastened to the shaft 124. A link 130 connects the lever arm 128 to a lever 132 pivoted at one end to a bracket 134, mounted on the wall of the flow indicating casing. The other end of the lever 132 carries a horizontal rod 136 which extends under the chamber 38 and has a pointer 138 on its front end arranged to move over the dial 82. In order to lower the centre of gravity of the float 119 and stem 120 and to present the float from wedging against the side of the cylinder 116, weights 140 caried by supporting rods 142 are rigidly fastened to the stem 120. As the level of the liquid in the cylinder 116 rises or falls through the action of a rise or fall in the pressure difference in the pipes 30 and 100, the float 119 rises or falls correspondingly and transmits motion to the end of the lever arm 122. This motion is transmitted through the lever arms 122 and 128 and link 130 to the lever 132 and pointer 138. When the temperature of the fluid whose composition is to be determined does not vary appreciably, or if the density of the fluid does not vary with the temperature variations, the scale 82 may be graduated directly in terms of the composition of the fluid. However, if the temperature variations in the fluid materially affect the density of the fluid, the record may be corrected from independent measurements of the temperature of the fluid or the scale 82 may be graduated in terms of the density and the composition calculated from the density and temperature measurements.

When the apparatus is used for different fluids, or mixtures of fluids which have different density variations, the apparatus should be adjusted to bring the pointer to the zero mark on the scale when the lightest mixture of fluids is flowing through the pipe section 98. In adjusting the apparatus, for example, in measuring the composition of an oil and water mixture, liquid is poured into or removed from the cylinder 110, after removing the cap 112, to raise or lower the float 119 until the pointer 138 is brought to the zero mark on the dial scale 82 for a difference in pressure in the pipes 30 and 108 corresponding to the density of water free oil. When a mixture of water and oil flows through the pipe section 98, the pointer 138 will be displaced to correspond to the percentage of water in the mixture. It is, however, difficult to pour just the right amount of liquid into the cylinder 110 to bring about this adjustment. To obtain the final adjustment of the liquid levels, therefore, a displacement member 144 is supported by a stem 146 which passes through a bracket 148 on the wall of the cylinder 110 and is held in position on the bracket 148 by means of adjusting nuts 150. To raise or lower the level of the liquid in the cylinders 110 and 116, the displacement member 144 is lowered or raised by means of the adjusting nuts 150 and liquid forced into or out of a well 152 in the bottom of the cylinder 110 until the level of the liquid is brought to the desired point.

The position of the pointer 138 may be adjusted without removing the cap 112 and thereby disturbing the pressures, by varying the length of the link 130. For this purpose the link 130 is divided into two parts, the ends of which are oppositely threaded and are connected by means of a turn-buckle 154. By turning the turnbuckle 154 the length of the link 130 may be varied and the pointer 138 thereby raised or lowered to the zero mark without changing the position of the lever arm 128 or the levels in the cylinders 110 and 116.

When the fluid meter is to be used for liquids whose densities may vary between different limits, it is desirable to adjust the deflection of the pointer 138 for any variation in density, so that a full scale deflection will be obtained between these limits. In order to vary the deflection of the pointer for any given density, the link 130 is slidably mounted on the lever arms 128 and 132. By sliding the link 130 on the lever arms 128 and 132, the movement of the pointer 138 for any given change in density may be varied in the same manner that the movement of the pointer 80 is varied in the case of flow measuring device. The apparatus may, accordingly, be adjusted to give a full scale displacement to the pointer for any given changes in density. The lever arms 128 and 132 are suitably graduated to express the ratio of pointer deflection to density of fluids.

The dial 82 may be rotated by clock work and the ends of the pointers 80 and 138 may be provided with pens whereby variations in the flow and density of the fluid for a certain length of time may be recorded by curves traced on the scale or dial 82 by the pens. The front wall of the indicating and recording apparatus is provided with a glass window 156 in front of the scale 82 through which the scale and the pointer positions may be read at any time.

The preferred form of my invention having been thus described, what is claimed as new is:

1. A method of determining the rate of flow and density of a flowing fluid stream in a closed conduit which comprises creating a change in pressure head of said stream having a known relation to the rate of flow thereof, developing a pressure differential in a measuring fluid proportional to the pressure difference between points in said flowing fluid immediately before and immediately after said change in pressure head, causing the said flowing fluid to flow at a low velocity in a vertical direction from the point of low pressure of the said pressure change, developing in a measuring fluid a pressure differential proportional to the pressure difference between points in said flowing fluid a fixed distance apart in the path of the vertical flow, taking simultaneous measurements of the pressure differentials thus developed, and obtaining simultaneous determinations of the density and rate of flow of the flowing fluid therefrom.

2. A method of determining simultaneously the density and rate of flow of a flowing fluid stream which comprises creating a change in pressure head of said stream having a definite relation to the rate of flow thereof, developing two pressure differentials in measuring fluids having a definite relation respectively to the difference in pressure between points in said stream immediately before and after said change in pressure head, and between one of said points and a third point in said stream vertically spaced a definite distance therefrom, said pressure differentials being independent of atmospheric pressure, and simultaneously measuring the pressure differentials thus developed in said measuring fluids.

3. A method of determining the density and rate of flow of a flowing fluid stream which comprises, creating a change in pressure head of said stream having a definite relation to the rate of flow thereof, developing a pressure differential in a measuring fluid corresponding to the difference in pressure between points in said stream located at the same level before and after said change in pressure head, developing a second pressure differential in a measuring fluid equal to the pressure difference between one of said points and a third point in said stream vertically spaced a definite distance therefrom, and taking simultaneous measurements of the measuring fluid pressure differentials thus developed.

4. A method of determining the rate of flow and density of a flowing body of fluid which comprises, creating a drop in pressure in the fluid having a definite relation to the rate of flow thereof, developing a pressure differential in a measuring fluid bearing a definite relation to the pressure drop thus created in said flowing fluid body, developing a second pressure differential in a measuring fluid bearing a definite relation to the density of said flowing fluid body, and simultaneously measuring the pressure differentials thus developed.

5. A method of determining the density and rate of flow of a flowing body of liquid which comprises, creating a drop in pressure in said liquid having a definite relation to the rate of flow thereof, developing a gaseous pressure differential proportional to the pressure difference between two points in said liquid at opposite sides of said pressure drop, developing a gaseous pressure differential proportional to the pressure difference between one of said points in said liquid and a third point in said liquid vertically spaced a fixed distance therefrom, and taking simultaneous measurements of the gaseous pressure differentials thus developed.

6. A method of determining the rate of flow and density of a flowing body of fluid in a closed conduit under pressure which comprises, creating a change in pressure head of the fluid having a definite relation to the rate of flow thereof, forcing three streams of measuring fluid into the said flowing fluid at points so spaced, vertically and horizontally, that the resulting differences in the pressure of two of the streams with respect to the third bear definite relations respectively to the density and rate of flow of the said body of flowing fluid, and measuring the simultaneous differences in said pressures.

7. A method of measuring the rate of flow and the density of a flowing fluid under pressure which comprises, creating a change in pressure head of the fluid having a definite relation to the rate of flow thereof, forcing two streams of gas into the said fluid under conditions such that the pressure produced in the respective streams will be independent of atmospheric pressure and the pressure difference of the said streams will have a definite relation to the rate of flow of the said fluid, causing the said fluid to flow at a slow velocity and forcing a stream of a gaseous medium into the said fluid at a level different from that of one of the first mentioned streams whereby the difference in the pressure between the last mentioned stream and one of the first mentioned streams equals the only difference in the pressure of the liquid at the respective levels thereof, and recording the said simultaneous differences in said pressures in terms of the density of the said flowing liquid and of the rate of flow thereof.

8. A fluid meter having, in combination, means for developing in a gaseous medium pressures independent of atmospheric pressure and having a pressure difference which bears a definite relation to the rate of flow of the fluid to be metered, means cooperating therewith for developing pressure differences in a gaseous medium proportional to the density of said fluid and independent of atmospheric pressures, and means responsive to the pressure differentials thus developed for recording the simultaneous values of said gaseous pressure differences in terms of the rate of flow of said fluid and of the density of said fluid, respectively.

9. A fluid meter having, in combination, a flow resistance element, separate means whereby a regulated amount of measuring fluid may be forced into the fluid to be metered at each side of said flow resistance element at a difference in pressure proportional to the change in pressure head of fluid in passing said flow resistance element, means whereby measuring fluid may be forced at a regulated rate into said flowing fluid at a level different from that where measuring fluid may be forced by said first mentioned means, a gas tight chamber, means connecting one of said first mentioned measuring fluid forcing means to said chamber, two U-tube manometers each having an open leg in communication with said chamber, separate means connecting a closed leg of each of said manometers to one of the measuring fluid forcing means not connected to said chamber, a liquid in each of said manometers, and indicating means operative in accordance with changes in level of the liquid in the open legs of each of said manometers.

10. A fluid meter having, in combination, a conduit for the passage of a fluid, a device for creating a change in pressure head in fluid passing through said conduit bearing a definite relation to the rate of flow thereof, means for developing a pneumatic pressure differential bearing a definite relation to the change in pressure head created by said device, mechanism connected to said conduit for developing a pneumatic pressure differential bearing a definite relation to the density of the fluid in said conduit, and means for simultaneously indicating the pneumatic pressure differentials thus developed, respectively, in terms of the rate of flow of the said fluid and of the density of the said fluid.

11. In a fluid meter adapted to measure the rate of flow of fluid through a conduit, the combination of a U-tube manometer, means for creating pressures having a definite relation to the rate of flow of said fluid and for transmitting said pressures to the liquid surfaces in said manometer, displacement means in one arm of said manometer, adjustable to vary the amount of liquid displaced, a lever, means governed by the liquid level in one arm of said manometer for deflecting said lever, a flow indicating pointer, a link connecting said pointer to one arm of said lever, means whereby the position of said link may be adjusted on said lever arm and on said pointer, and means for varying the length of said link.

12. In a fluid meter the combination of a U-tube manometer having liquid surfaces, means for transmitting pressures to the liquid surfaces in said manometer, a lever, means governed by the liquid level in one arm of said manometer for deflecting said lever, an indicating pointer, a link connecting said pointer to one arm of said lever, and means whereby the position of said link may be adjusted on said lever arm and on said pointer.

13. In a fluid meter, the combination of a U-tube manometer having liquid surfaces, means for transmitting pressures to the liquid surfaces in said manometer, a lever, means governed by the level in one arm of said manometer for deflecting said lever, an indicating pointer, a link connecting said pointer to one arm of said lever, and means for varying the length of said link.

14. A fluid meter having, in combination, a conduit, means for developing pressure differentials in a gaseous medium having a definite relation to the rate of flow of fluid through said conduit, U-tube liquid containers in communication with said gaseous medium, a flow indicating pointer, a float and stem in one of said liquid containers, means connecting said float to said flow indicating pointer, and means on said float stem for bringing the centre of gravity of said float and stem below the centre of displacement of said float.

15. A fluid meter having, in combination, a closed conduit embodying in its structure a horizontally disposed segment and a vertically disposed segment connected by a right angle bend, a flow resistance member mounted transversely in said horizontal segment adjacent said bend, means connected with said conduit at opposite sides of said resistance member for developing a pressure differential proportional to and controlled by the pressure drop created by said resistance member in fluid flowing through said conduit, mechanism connected with the vertical segment of said conduit and cooperating with said means to develop a pressure differential proportional to and controlled by the density of fluid flowing through said conduit, and a rate of flow and density indicating device operatively connected to said means and mechanism.

16. A fluid meter having, in combination, a flow restriction over which fluid may flow, separate means whereby a regulated amount of gas may be introduced into said flowing fluid at each side of said restriction at a difference in pressure proportional to the drop in pressure of the fluid passing said restriction, means whereby gas may be introduced at a regulated rate into said flowing fluid at a level different from that at which gas from said first mentioned means is introduced, a gas tight chamber, means connecting one of said first mentioned gas introducing means to said chamber, two U-tube manometers each having an open leg in communication with said chamber, separate means connecting closed legs of each of said manometers to one of the two gas introducing means not connected to said chamber, liquid in said manometers, and indicating means operable in accordance with changes in level of the liquids in the open legs of said manometers.

17. A fluid meter having, in combination, a conduit for the passage of a fluid, a plate spanning said conduit, an orifice in said plate, means whereby streams of gas may be introduced at a uniform regulated rate into said conduit at each side of said orifice plate, a compartment communicating with one of said means, a closed vertical cylinder communicating with the other of said means, a vertical adjustable displacement member in the lower part of said cylinder, a second cylinder within said compartment open at its upper end, a tube connecting the lower parts of said cylinders, a float in said open ended cylinder, a lever pivoted gas tight in one wall of said compartment and having one arm within the compartment and the other arm outside the compartment, said arm within the compartment being connected to said float, a pivoted pointer outside said compartment, an adjustable connection between the outer arm of said lever and said pointer, and a body of liquid in said cylinders extending up around said displacement member and supporting said float, said displacement member being so shaped that the volume of liquid driven from the first cylinder to the second cylinder under any given difference in pressure will be directly proportional to the flow of fluid through said orifice under said difference in pressure.

18. A fluid meter having in combination, a conduit, a device for creating a change in pressure head in fluid flowing through said conduit proportional to the flow, means connected to said conduit for developing a differential pressure proportional to the change of fluid pressure head created by said device, mechanism for developing a pressure differential proportional to a predetermined hydrostatic head of fluid in said conduit proportional to the fluid density, and a device responsive to the pressure differentials developed by said means and mechanism for indicating simultaneously the rate of flow and density of fluid in said conduit.

19. A fluid meter having, in combination, a conduit, a flow restricting device mounted in said conduit intermediate its ends, means communicating with said conduit arranged to develop a pressure differential having a definite relation to the rate of flow of fluid past said flow restricting device, mechanism communicating with said conduit arranged to develop a pressure differential proportional to the density of fluid flowing through said conduit, and an indicating device responsive to the pressure differentials developed by said means and mechanism.

In testimony whereof I affix my signature.
BENJAMIN GREENFIELD.